(12) United States Patent
Behr et al.

(10) Patent No.: US 6,590,755 B1
(45) Date of Patent: Jul. 8, 2003

(54) APPARATUS FOR ELECTRONIC MONITORING OF THE SUPPLY CURRENT OF MODULES CONNECTED TO A BUS

(75) Inventors: Thorsten Behr, Horn-Bad Meinberg (DE); Harald Grewe, Bad Lippspringe (DE)

(73) Assignee: Phoenix Contact GmbH & Co., Blomberg (DE)

( * ) Notice: Subject to any disclaimer, the term of this patent is extended or adjusted under 35 U.S.C. 154(b) by 0 days.

(21) Appl. No.: 09/576,577

(22) Filed: May 22, 2000

(30) Foreign Application Priority Data

May 21, 1999 (DE) .......................... 199 23 569

(51) Int. Cl.$^7$ .............................. H02H 3/00; H02H 7/00
(52) U.S. Cl. ....................................... 361/62
(58) Field of Search ...................... 361/62; 395/750.01, 395/750.02; 439/680

(56) References Cited

U.S. PATENT DOCUMENTS

| | | | | |
|---|---|---|---|---|
| 4,891,743 A | * | 1/1990 | May et al. ..................... | 363/87 |
| 5,664,202 A | * | 9/1997 | Chen et al. ............ | 395/750.08 |
| 5,675,813 A | * | 10/1997 | Holmdahl ................... | 395/750 |
| 5,682,314 A | * | 10/1997 | Nishino et al. ....... | 364/424.034 |
| 5,758,172 A | * | 5/1998 | Seo ........................ | 395/750.01 |
| 5,781,780 A | * | 7/1998 | Walsh et al. ........... | 395/750.01 |
| 5,884,086 A | * | 3/1999 | Amoni et al. .......... | 395/750.01 |
| 6,000,042 A | * | 12/1999 | Henrie ......................... | 714/40 |
| 6,086,430 A | * | 7/2000 | Amoni et al. ............... | 439/680 |

* cited by examiner

Primary Examiner—Brian Sircus
Assistant Examiner—Zeev Kitov

(57) ABSTRACT

The invention relates to an apparatus for electronic monitoring of the supply current of modules connected to a bus, in particular for monitoring the supply current of bus devices of an automation bus system.

The object of the invention is to provide an apparatus for electronic monitoring of the supply current of modules connected to a bus, which on the one hand, if required, carries out reliable isolation from the supply voltage, and simultaneously maintains the diagnostics capability for the purpose of fault locating.

The invention achieves this by virtue of the fact that the apparatus has at least one device for detecting and at least one device for limiting and/or disconnecting the supply current.

In this case, the device for disconnecting the supply current responds to the value of the detected supply current, it being ensured thereby that the energy supply for other modules of the automation bus, which are connected in parallel with reference to the supply voltage, does not fail, as a result of which at least a limited operation of the system is maintained, and thus fault diagnosis also remains possible.

22 Claims, 3 Drawing Sheets

APPARATUS FOR ELECTRONIC MONITORING OF THE SUPPLY CURRENT OF MODULES CONNECTED TO A BUS

The invention relates to an apparatus for electronic monitoring of the supply current of modules connected to a bus, in particular for monitoring the supply current of bus devices of an automation bus system.

Present day automation systems, that is to say control and data transmission systems, generally have a multiplicity of electronic modules which all have to be supplied with electric energy. For this purpose, the individual modules, for example the bus devices, are connected in parallel to a voltage supply by means of a central power supply unit. A short circuit occurring in a bus device, or an overload which occurs can lead to the consequence that the voltage supply collapses, and thus the other connected modules cannot be further supplied with energy either, and therefore fail. The data traffic in the automation bus system fails, and this finally entails a total failure of the system. Fault location, that is to say locating the fault site, is possible only by virtue of the fact that the individual modules are removed from the system and individually checked, something which is very time-consuming.

In order to prevent the total failure of the system, the modules are frequently connected to a voltage supply by segment or section, an individual segment being protected against short circuits with the aid of a fuse or a miniature circuit breaker. However, in this case the feeding power supply unit must be capable of carrying out the isolation of the relevant segment from the supply in a reliable fashion, if required. In some circumstances, however, tripping the fuse can give rise to difficulties as long as the branch to be protected against short circuits is in overload, but no short circuit is yet present.

The object of the invention is thus to provide an apparatus for electronic monitoring of the supply current of modules connected to a bus, which on the one hand, if required, carries out reliable isolation from the supply voltage, and simultaneously maintains the diagnostics capability for the purpose of fault locating.

This object is already achieved by means of an apparatus having the features of claim 1, and by means of an automation bus system as claimed in claims 15 and 16.

Advantageous developments of the invention are specified in the subclaims.

In order to be able reliably to detect the occurrence of a fault, that is to say an overload or a short circuit inside a module or a connection between the modules, the apparatus according to the invention comprises a device for detecting the flowing supply current. Furthermore, the apparatus has a device for limiting and/or for disconnecting the supply current, which operates in response to the detected supply current, and thereby ensures that the energy supply for other modules of the automation bus, which are connected in parallel with reference to the supply voltage, does not fail, as a result of which at least a limited operation of the system is maintained, and thus fault diagnosis is also possible despite the occurrence of an overload or a short circuit. If the device for detecting the supply current establishes, for example, an impermissibly increased supply current, the supply current for the module connected downstream of and assigned to the apparatus is disconnected in response thereto, or at least limited.

In this case, according to the invention a module can be an arbitrary component or an arbitrary unit, which can be used to design an automation system.

It is possible for the first time with the aid of the invention for bus segments, in the event of a fault or on start-up, to be connected and disconnected in a noninteracting fashion with full maintenance of the diagnostic function, since owing to the isolation of the module which is, for example, defective or has a defective assigned connecting line, only this one module or a single segment of the system with a plurality of modules is isolated from the supply voltage, while the remainder of the system remains in operation.

In order, on the one hand, further to improve the possibility of diagnosis and, on the other hand, to provide communication between the apparatus according to the invention and the controller of the automation system, the apparatus can be connected to the automation bus. Consequently, the apparatus according to the invention can, for example, be caused to disconnect a module, in particular a bus device, by the controller of the system. This signifies a marked improvement in the reliability of such automation bus systems since, for example, unreliable bus devices which no longer react to the customary control commands can be disconnected via the controller. Furthermore, the controller can retrieve the supply current flowing toward the module at any time, and thus make an early detection of overloads which may be developing, and thereupon initiate the necessary measures before the failure of the bus device or the module.

In order to provide a high flexibility of the apparatus according to the invention for the purpose of adaptation to all conceivable requirements, the parameterization of the disconnection, in particular the tripping current and/or the disconnection characteristic, can be performed manually and/or via the bus. Consequently, it is also possible, for example, for the response of the apparatus according to the invention to the detected supply current or to the detected electric load to be modified during operation of the system, and/or the apparatus can be reset centrally to altered conditions, for example to an exchange of a module with a changed supply voltage requirement.

For the purpose of modifiable setting, the apparatus according to the invention can comprise a storage device in which, for example, the limiting value of the supply current, that is to say the value at which, or in the case of the exceeding of which, the device disconnects the supply current, or the supply current is limited, can be stored as tripping current value. Furthermore, the disconnection characteristic or else minimum, maximum and instantaneous values of the supply current can be stored in the storage device, these values being available, for example, in the case of a diagnosis on the apparatus or, for example, a diagnostic program via the automation bus. In addition, time marks assigned to the respective current values can also be stored for the purpose of detecting a temporal variation in the supply current. Furthermore, these values can also be retrieved by the controller at any time.

In order to support the fault locating, and to provide a simple control possibility, it can be provided to render the denoted supply current values readable by means of a display device on the unit or on a display assigned thereto.

In order to prevent inadvertent reconnection of the supply current, the apparatus is automatically locked after the response of the disconnection or of the limitation, and can be cleared only manually or, depending on the embodiment, also via the bus by means of a reset. This is important, in particular, so that a disconnected module is not reconnected inadvertently, something which could entail consequential damage under some circumstances.

The apparatus according to the invention can advantageously also be set up to detect ground faults.

In order to provide flexible adaptation to all conceivable possibilities of use of the apparatus according to the invention, the apparatus can comprise a power supply unit, in order, for example, to adapt a single-phase or three-phase ac voltage to the dc voltage or dc voltages usually required of a bus device. Consequently, together with the additional feature of the bus connection of the apparatus according to the invention the advantageous result is a power supply unit with bus capability in the case of which individual voltages, or all voltages provided, can be connected or disconnected, for example, by means of the controller via the bus, or else manually. If the bus logic circuit and unit logic circuit (for example sensor system or activator system) of a bus device are supplied separately, it is possible, for example, in the case when a short circuit has occurred in the unit logic circuit, for the latter to be specifically disconnected by means of an apparatus according to the invention, as a result of which the bus connection of the bus device continues to remain available, and thus the bus traffic can also be maintained in the relevant segment.

For the purpose of integrating the apparatus according to the invention into an emergency stop system, said apparatus can also have an emergency stop input via which the apparatus can be caused to disconnect the supply current. Furthermore, the apparatus can be set up in such a way that it disconnects the supply voltage in response to at least one safety-related output, for example a signal of a temperature monitor, a humidity sensor, a proximity switch, an overvoltage sensor, an overload sensor or a fire and/or smoke detector. The apparatus according to the invention can therefore be excellently integrated into any desired emergency stop system, it being possible for the supply voltage to be switched both via external inputs, and by means of control signals via the bus.

In order to enhance the possibility of diagnosis, the apparatus can be set up to feed back the disconnection or the limitation of the supply current to the control system. The feedback, in particular via the automation bus, can in this case comprise a data item for identifying the apparatus and/or the at least one module assigned to it. In this way, the system can determine the fault site exactly, or at least determine the section in which, for example, there has been a short circuit when an apparatus for a plurality of modules, for example bus devices, undertakes the monitoring. As a result, the fault locating is substantially simplified, or can in some circumstances be carried out automatically by the system itself.

As already mentioned, the apparatus according to the invention can be used advantageously in an automation bus system which comprises at least a controller, an automation bus and bus devices. For example, in a section of the system which comprises a plurality of bus devices, it is possible to arrange for the purposes of supplying voltage to these bus devices an apparatus according to the invention which is connected upstream of the bus devices, while these bus devices are arranged in parallel with reference to their supply voltage. In this case, a single apparatus according to the invention monitors the supply voltage of a plurality of bus devices. The possibility of diagnosis is limited in this case to the entire section. Owing to the response of the apparatus according to the invention, that is to say the isolation from the supply voltage, the occurrence of an overload in one of the parallel-connected bus devices leads to the disconnection of all the devices.

If, however, an apparatus according to the invention is connected upstream of each bus device in the automation bus system with reference to its supply voltage, in the event of a short circuit or an overload on a specific bus device, this individual bus device can be disconnected specifically and be identified specifically as fault site. In this case, the apparatuses according to the invention can advantageously be connected to the automation bus. If the bus device fails upon disconnection of the supply voltage, the apparatus according to the invention which is assigned to the bus device can, for example, provide the controller via the bus with the required information on the fault site.

If the automation bus is a serial one, for example a bus according to EN 50254, the apparatuses according to the invention can all be connected to a common bus spur, at least in a section of the system. If the bus devices assigned to the respective apparatuses are also connected to a common bus section, which, however, differs from the bus spur of the apparatuses according to the invention, the diagnostics capability is maintained for the apparatuses according to the invention independently of the respective bus devices, since disconnection of the bus section belonging to the bus devices has no effect on the bus spur to which the apparatuses according to the invention are connected on the bus. The system can thus detect completely and unambiguously a failure of bus devices, for example in a local section, and can reconfigure the automation bus system so as to permit further operation of the system.

The invention is explained below by the description of some exemplary embodiments on the basis of the attached drawings, in which.

Figure 1:
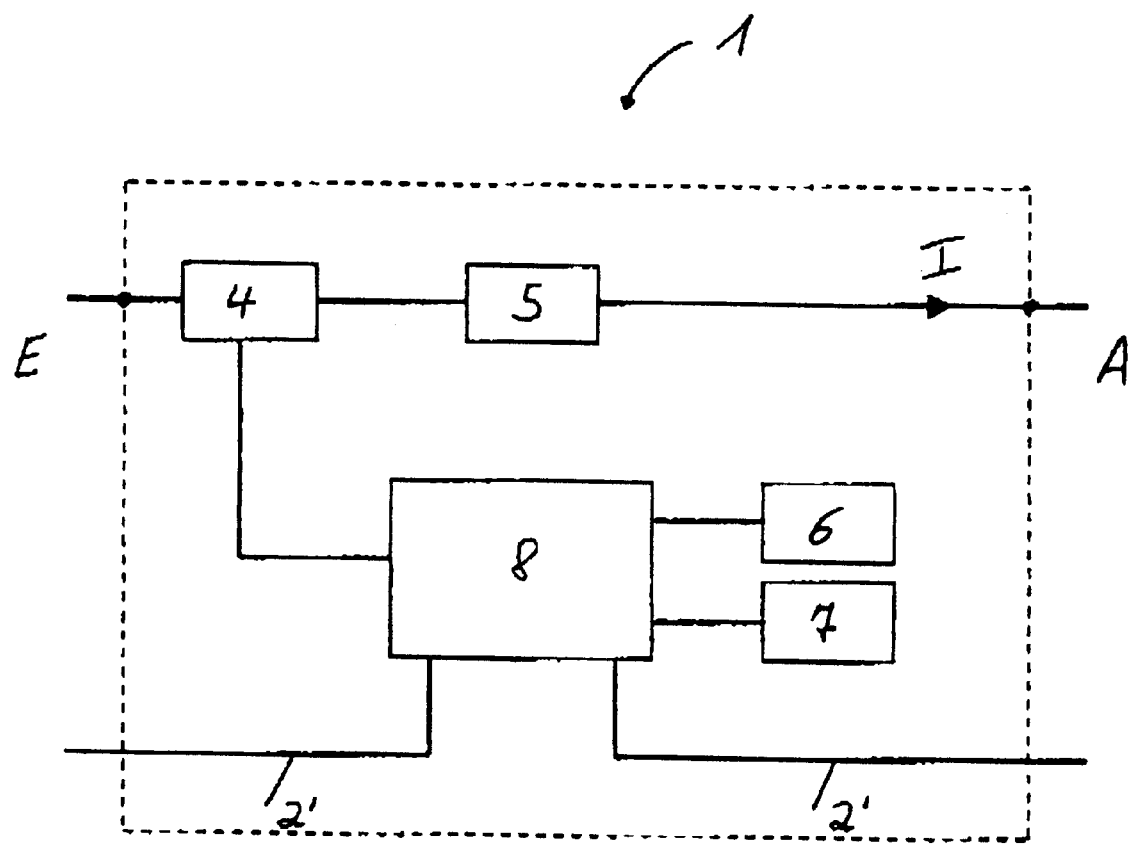
FIG. 1 shows a block diagram of an embodiment of the apparatus according to the invention.

An exemplary embodiment of the apparatus 1 according to the invention for electronic monitoring of the supply current of modules connected to a bus is shown in FIG. 1. Basically, it has an input E to which the supply voltage is applied. The apparatus comprises a device 4 for detecting the supply current I. In a way not illustrated, the apparatus also obtains its operating current via the input E. In addition to the device 4, there is a second device 5, with the aid of which the supply current I can be interrupted at the output A. The assigned module, for example a bus device, or else a plurality of modules with their supply voltage input(s) is connected to this output.

Depending on the embodiment, the device 5 for disconnecting the supply current can be designed as a relay, as a circuit breaker and/or as a semiconductor switch. It is also possible in one embodiment of the invention for the apparatus to be set up to limit the supply current. This can be realized, for example, with the aid of a semiconductor switch as device 5.

The device 5 is controlled in response to the current measurement in the device 4. In the present exemplary embodiment, a microprocessor 8 is responsible for the control. The embodiment according to the invention is presently connected to the automation bus 2'. Consequently, all the operations in the apparatus according to the invention can additionally be initiated by the controller of automation system via the bus, but can also be logged. The connection of the apparatus to the automation bus is implemented in a conventional way. Thus, on the one hand commands of the control system can be relayed to the apparatus, for example the disconnection of the supply current can be carried out by actuating the circuit breaker 5, and on the other hand the transmission of data, for example, the instantaneous value of the supply current, to the controller is rendered possible. In addition, the parameterization of the disconnection, for example, the limiting value of the supply current at which the supply current is disconnected or limited, and the disconnection characteristic, that is to say the temporal variation in disconnection, can be carried out here additionally by the controller via the bus, instead of manually as in a simpler embodiment of the invention.

In a development of the invention, the described embodiment in FIG. 1 further comprises a storage device 7 in which, for example, minimum, maximum, instantaneous values and/or the limiting value of the supply current is stored. The stored data are displayed on a display device 6 on the unit, or can be transmitted via the bus to the control system, and processed there.

After the response of the circuit breaker 5, which is a semiconductor switch in the embodiment described, the output A of the apparatus 1 is locked. This means that the apparatus can be brought into an operational state again only via a specific reset command via the bus or an appropriate switch on the apparatus.

In the case of the embodiment shown in FIG. 1, the dc voltage required by the module is present directly at the input E. In a further exemplary embodiment of the invention, illustrated in FIG. 2, the apparatus 1 also comprises a power supply unit 10 with the aid of which the single-phase or three-phase ac voltage present at the input is converted into the required dc voltage or into the required dc voltages.

The apparatus according to the invention operates to this end as a bus-controlled electronic fuse which has a multiplicity of possible applications. If the apparatus is set up for processing a three-phase ac voltage, the apparatus according to the invention has three voltage outputs which are monitored separately, that is to say each output is provided in each case with a device for monitoring the respective supply current and a device for disconnecting and/or for limiting the supply current.

The apparatus has two emergency stop inputs (not illustrated in the figures) by way of example in a safety-orientated embodiment, via which the apparatus can be caused to disconnect the supply current of the module or modules assigned to it. For example, a proximity switch and a smoke detector are located in the working environment of a welding robot. Their safety-related outputs are led to assigned inputs of the apparatus according to the invention such that the bus device assigned to the robot, and thus the robot itself is disconnected by isolating the bus device from the supply voltage in the event of the detection of smoke or the detection of a person in the working environment of the robot.

After the complete disconnection of a bus device, that is to say the disconnection of the unit logic circuit and the bus logic circuit, this bus device can no longer take part in the data transfer via the bus. Depending on the automation bus used, it is necessary to adapt the bus. For this purpose, the apparatus according to the invention is set up to feed back this disconnection of the supply voltage or the relevant module to the control system. This feedback comprises at least one data item for identifying the apparatus and/or the module assigned to it in the described example of the bus device of the welding robot. As a result, the control system is directly informed of which module has failed, and the control system on the one hand adapts the bus transfer to the changed circumstances and can, on the other hand, bring other devices, which depend on the welding robot and are therefore not currently required, into an idle state. For example, it is possible in this way for relevant local bus sections of the automation system to be disconnected specifically.

Figure 2:
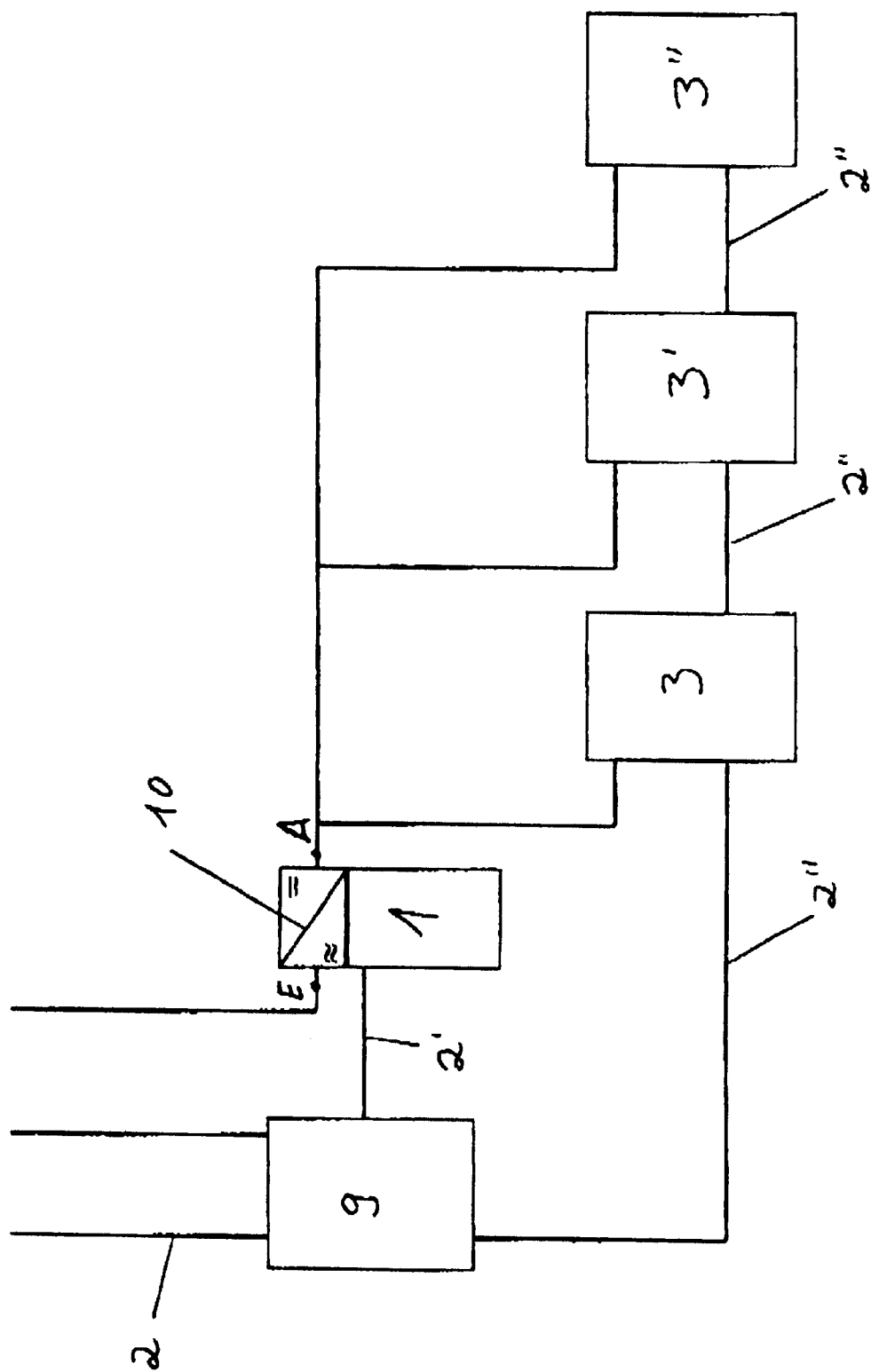
FIG. 2 illustrates a section of an automation bus system in which an apparatus according to the invention is arranged.

The use of the apparatus according to the invention in an automation bus system is illustrated by way of example in section in a block diagram in FIG. 2. The automation system comprises a controller (not illustrated), an automation bus 2 and bus devices 3, 3' and 3". The device 1 is connected to the bus 2 via a bus coupler 9. In the present case, the apparatus for electronic monitoring of the supply current has a voltage input at which a three-phase ac voltage is present. Consequently, the apparatus also comprises a power supply unit 10 which converts this ac voltage into a dc voltage with the aid of which the supply voltage inputs of the devices 3, 3' and 3" are fed. The supply voltage inputs of the bus devices are situated in parallel at the output A of the apparatus according to the invention, and the bus devices are connected in a bus section 2" to the automation bus.

The apparatus 1 for electronic monitoring of the supply voltage is therefore competent for monitoring the supply current of the three bus devices 3, 3' and 3" shown. If a short circuit or an overload occurs in one of said bus devices, the apparatus according to the invention disconnects all three bus devices by separating them from the supply line. Said bus devices can no longer take part in the data traffic via the bus. However, this does not hold for the apparatus 1, which can, for example, report the failure to the control system via the bus interface 2'. The diagnosis of the system is thereby maintained.

Figure 3:
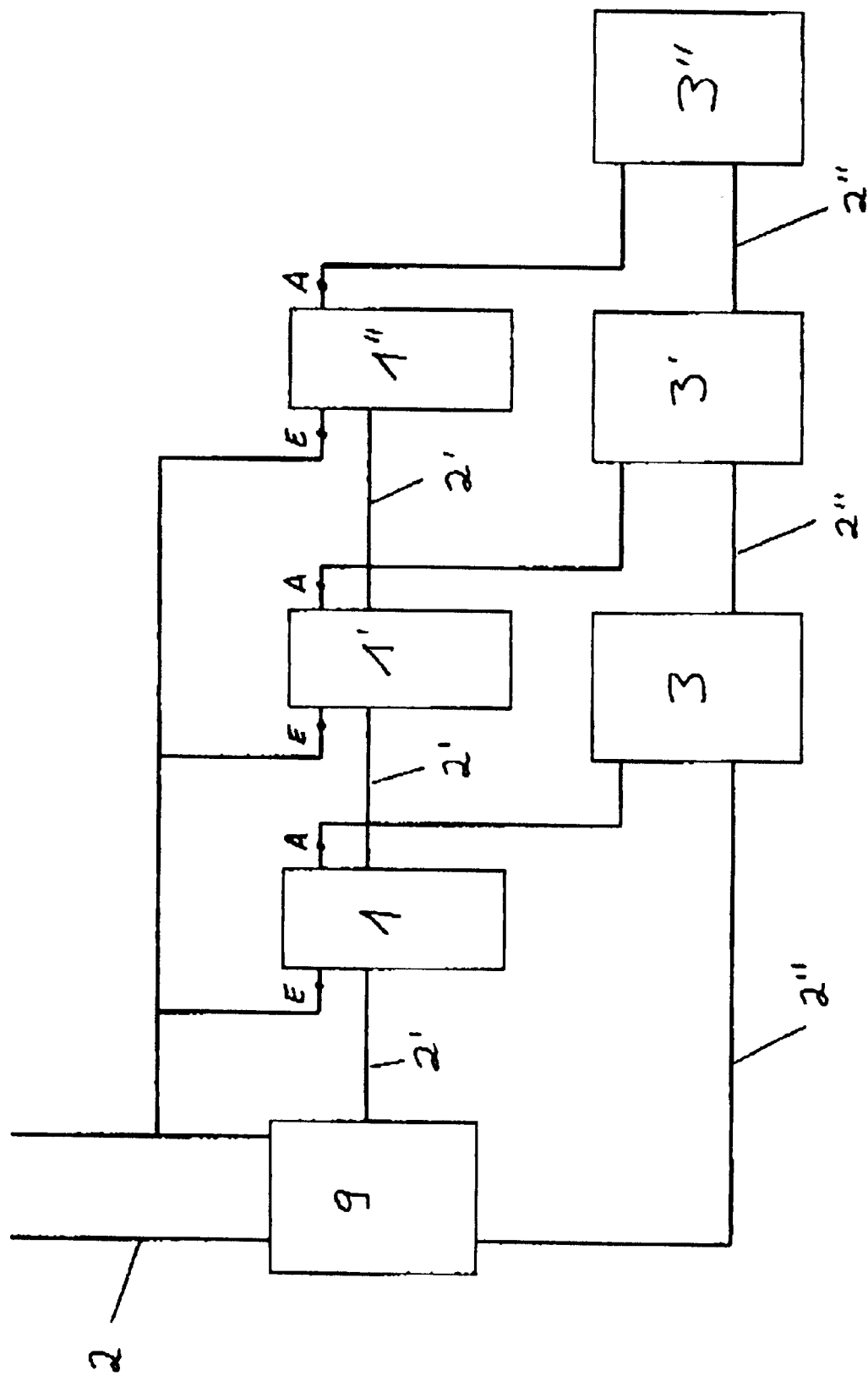
FIG. 3 shows a section of an automation bus system in which a plurality of apparatuses according to the invention are arranged.

A further type of use of the apparatus according to the invention for electronic monitoring of the supply current of a module connected to a bus is shown in part in FIG. 3. Three bus devices 3, 3', 3" are once again connected to a bus 2 via the bus section 2". Each bus device is connected via an apparatus 1, 1', 1" according to the invention to the voltage supply, which in the case shown outputs the dc voltage required by the devices directly to the voltage inputs of the apparatuses. A bus spur 2' departs from the incoming bus 2 by means of the bus coupler 9, all three apparatuses 1, 1', 1" according to the invention being connected to the bus system spur 2'. If, for example, a short circuit or an overload on the last bus device 3" occurs, the assigned apparatus 1" according to the invention disconnects the voltage supply of said device. The two other bus devices 3 and 3' therefore both remain connected and it continues to be possible to address them via the bus, if the last active bus device is set up to close the bus loop upon the occurrence of a fault in the downstream bus device. Furthermore, in the illustrated automation bus system of the defective device can be exactly identified, since an apparatus (1, 1', 1") is in each case responsible only for one assigned bus device.

If, because of a short circuit or an overload, the bus device 3' fails through the response of the assigned apparatus 1', that is to say this bus device is separated from the supply voltage, the data transfer to the bus device 3" is interrupted. Consequently, in an advantageous embodiment, for example for the case in which no hard short circuit is present, according to the invention the apparatus 1' cannot completely isolate the supply voltage of the defective bus device 3', but can only limit the supply current, with the result that in some circumstances the communication between the bus device 3" and the control system of the automation bus system can be maintained.

In an embodiment which is not illustrated, the apparatus according to the invention is set up to detect a ground fault.

In this case, the differential current between plus and minus of the supply line is detected, and the supply current is interrupted in response to this differential current when a prescribed value is exceeded.

In a particular embodiment of the invention, in particular for serial automation buses, the apparatus (1, 1', 1") has a device for bridging the bus interface of the bus device assigned to it. After disconnection of the bus device, the apparatus can ensure the operation of the bus despite the failure of the bus device by means of the designated device. Furthermore, it is also possible, of course, to use system control signals via the bus to cause the apparatus to bridge the bus device. For this purpose, the apparatus according to the invention is arranged in series with the bus device, assigned to it, on the serial bus, the apparatus additionally having a bus bypass which can be activated if required.

In principle, the invention can be applied to all automation bus systems and, in particular, is not limited to the serial bus systems set forth by way of example. Furthermore, it is within the scope of the invention for the apparatus according to the invention to be integrated into the module itself, for example into the bus devices.

What is claimed is:

1. An apparatus (1, 1', 1") for electronic monitoring of the supply current of modules connected to a bus, in particular for monitoring the supply current of bus devices (3, 3', 3") of an automation bus system, and for detecting the occurrence of a fault of a module or of a connection between the modules, in particular of an overload or of a short circuit, comprising at least one device (4) for detecting the supply current and at least one device (5) for limiting or disconnecting the supply current (I), wherein the parameterization of the disconnection or limitation is performed manually or via the automation bus system (2).

2. The apparatus as claimed in claim 1, wherein the apparatus (1, 1', 1") comprises a device for connection to the automation bus system (2).

3. The apparatus (1, 1', 1") as claimed in claim 1, wherein the parameterization of disconnection or the limiting value of the supply current or the disconnection characteristic is performed manually or via the automation bus system (2).

4. The apparatus (1, 1', 1") as claimed in claim 1, wherein the apparatus comprises a storage device (7) in which it is possible to store the minimum, maximum, instantaneous value or limiting value of the supply current.

5. The apparatus (1, 1', 1") as claimed in claim 4, wherein the stored data are transmitted to a display device (6) of the apparatus or, via the automation bus system (2), to a control system of the automation bus system.

6. The apparatus (1, 1', 1") as claimed in claim 1, wherein the apparatus is locked after the response of the device (5) for limiting or disconnecting the supply current (I).

7. The apparatus (1, 1', 1") as claimed in claim 6, wherein resetting can be carried out at the apparatus (1, 1', 1") manually or via the automation bus (2).

8. The apparatus (1, 1', 1") as claimed in claim 1, wherein the apparatus (1, 1', 1") is set up to detect ground fault.

9. The apparatus (1, 1', 1") as claimed in claim 1, wherein the apparatus (1, 1', 1") comprises a power supply unit (10).

10. The apparatus (1, 1', 1") as claimed in claim 1, wherein the apparatus has at least one EMERGENCY STOP input via which the apparatus is caused to disconnect the supply current (I).

11. The apparatus (1, 1', 1") as claimed in claim 1, wherein in response to at least one safety-related output and/or in response to control signals via the automation bus (2), the apparatus disconnects the supply voltage.

12. The apparatus (1, 1', 1") as claimed in claim 1, wherein the apparatus (1, 1', 1") is set up to feed back a control system of the automation bus system for response of the device (5) for limiting or for disconnecting the supply current (I).

13. The apparatus (1, 1', 1") as claimed in claim 1, wherein the feedback to the control system comprises at least one data item for identifying the apparatus (1, 1', 1") or the at least one bus device (3, 3', 3") assigned to it.

14. A method for using an apparatus (1, 1', 1") for monitoring the supply current of bus devices (3, 3', 3") in an automation bus system comprising using the apparatus (1, 1', 1") in an emergency stop system.

15. An automation bus system, at least comprising a controller, an automation bus (2) and bus devices (3, 3', 3") and an apparatus (1) as claimed in claim 1, arranged at least in one section of the system for the supply of voltage of the bus devices which apparatus is connected upstream of the bus devices and connects the bus devices in parallel with reference to their supply voltage.

16. An automation bus system, at least comprising a controller, an automation bus (2) and bus devices (3, 3', 3") at least in one section of the system an apparatus (1, 1', 1") as claimed in claim 1 being connected upstream of each bus device with reference to its supply voltage, and the apparatuses being connected in parallel to a supply voltage.

17. The automation bus system as claimed in claim 16, wherein the apparatuses (1, 1', 1") are connected to the automation bus (2).

18. The automation bus system as claimed in claim 17, wherein the apparatuses (1, 1', 1") are serially connected to a bus spur (2').

19. The automation bus system as claimed in claim 18, wherein the bus devices (3, 3', 3") assigned to the respective apparatuses (1, 1', 1") are connected to a bus section (2").

20. The automation bus system as claimed in claim 18, wherein the apparatuses (1, 1', 1") and the bus devices (3, 3', 3") are respectively connected to different bus spurs (2') and bus sections (2") of the automation bus.

21. The automation bus system as claimed in claim 18, wherein the apparatus (1, 1', 1") has a device for bridging at least one bus device.

22. The automation bus system as claimed in claim 19, wherein the apparatuses (1, 1', 1") and the bus devices (3, 3', 3") are respectively connected to different bus spurs (2') and bus sections (2") of the automation bus.

* * * * *